United States Patent [19]
Little et al.

[11] Patent Number: 5,237,699
[45] Date of Patent: Aug. 17, 1993

[54] NONVOLATILE MICROPROCESSOR WITH PREDETERMINED STATE ON POWER-DOWN

[75] Inventors: Wendell L. Little, Carrollton; Stephen N. Grider, Farmers Branch, both of Tex.

[73] Assignee: Dallas Semiconductor Corp., Dallas, Tex.

[21] Appl. No.: 884,269

[22] Filed: May 8, 1992

Related U.S. Application Data

[63] Continuation of Ser. No. 238,809, Aug. 31, 1988, abandoned.

[51] Int. Cl.[5] .............................................. G06F 1/04
[52] U.S. Cl. .............................. 395/750; 364/DIG. 2; 364/948.4; 364/948.5; 364/934; 364/943.4
[58] Field of Search ................................ 395/750, 550

[56] References Cited

U.S. PATENT DOCUMENTS

| | | | |
|---|---|---|---|
| 3,715,729 | 2/1973 | Mercy | 364/200 |
| 3,859,638 | 1/1975 | Hume, Jr. | 314/900 |
| 4,143,283 | 3/1979 | Graf et al. | 307/66 |
| 4,234,920 | 11/1980 | Van Ness et al. | 364/200 |
| 4,245,150 | 1/1981 | Driscoll et al. | 364/900 |
| 4,316,247 | 2/1982 | Iwamoto | 364/200 |
| 4,317,180 | 2/1982 | Lies | 364/900 |
| 4,335,447 | 6/1982 | Jerrim | 364/900 |
| 4,458,307 | 7/1984 | McAnlis et al. | 364/200 |
| 4,464,584 | 8/1984 | Hantzschel et al. | 364/900 |
| 4,644,498 | 2/1987 | Bedard et al. | 364/900 |
| 4,748,559 | 5/1988 | Smith et al. | 395/750 |
| 4,763,297 | 8/1988 | Uhlenhoff | 364/900 |
| 4,766,567 | 8/1988 | Kato | 395/750 |
| 4,868,832 | 9/1989 | Marrington et al. | 395/750 |
| 4,873,271 | 1/1990 | Davis et al. | 395/750 |

Primary Examiner—Kevin A. Kriess
Attorney, Agent, or Firm—Worsham, Forsythe, Sampels & Wooldridge

[57] ABSTRACT

A battery-backed microprocessor which enters a known state on power-down. This is achieved, even if the microprocessor does not permit a single-cycle reset, by providing clock intercept circuitry on chip. When system power failure is detected, the clock intercept circuitry disconnects the external clock, activates a reset command, and then generates several clock cycles using an internal clock generator after the reset command. As many clock cycles are generated as is needed, with the particular architecture being used, to reach a predetermined state.

19 Claims, 5 Drawing Sheets

NONVOLATILE MICROPROCESSOR WITH PREDETERMINED STATE ON POWER-DOWN

This is a continuation of application Ser. No. 238,809, filed Aug. 31, 1988 now abandoned.

BACKGROUND AND SUMMARY OF THE INVENTION

The present invention relates to microprocessors (including microcontrollers and microcomputers), and particularly to microprocessors having a low-power standby state.

The DS5000 Soft MicroController TM, marketed by Dallas Semiconductor, Inc., is a microcontroller which has a small battery packaged with it, to provide nonvolatility. Microprocessors and microcontrollers of this kind are extremely useful, since the internal memory of the microprocessor is always preserved. Therefore, the microprocessor can be programmed to "learn" while in service, or to internally store a parameter set which is adjustable throughout the lifetime of the microprocessor. The present invention provides an improvement in such microprocessors.

Since the internal memory is normally closely integrated with the logic portions of the microprocessor, providing standby power to the memory portions necessarily means that standby power will be provided to other parts of the microprocessor as well. However, this can cause problems.

A common type of manufacturing defect, in manufacturing integrated circuits, is the creation of transistors which are slightly leaky when they are supposed to be in an off state. While such transistors may function perfectly well during normal operation, and the total of leakage current of this kind may not degrade the total power consumption of the chip excessively during normal operation, this additional leakage can be disastrous when the chip is being powered by a battery back-up. Chips for such applications may draw current, in the standby mode, which is of the order of nanoamperes, so that a small amount of additional leakage can drastically increase the standby current draw. Where the chip must be able to retain data for 10 years, even a very small leakage current may exhaust the battery long before 10 years have passed.

For many devices on the chip, testing procedures can be used to detect whether such leakage is occurring. However, not all transistors can be tested in this fashion. The possiblities for testing a particular transistor are dependent not only on its circuit interconnections, but also on the logic state that the circuit happens to be in. That is, if a particular transistor is in the "on" state, it will not be possible to detect whether it would have excess leakage current if it were in the "off" state. A chip can readily be tested to determine if leakage is excessive in a given state; but chips cannot readily be tested for excess leakage in all states.

That is, it has been discovered by the inventors of the present application that an additional reliability constraint, in addition to those normally tested for, exists in such battery-backed applications of very complicated integrated circuits. The entry into standby mode cannot simply save the existing state of the microprocessor, since the number of possible states is immense, and it would not be possible to test each of these states for unacceptable leakage.

Thus, for a nonvolatized microprocessor with a battery-driven power supply in its standby mode, it is necessary to be able to test the state in which the microprocessor will remain during its standby mode. It is not practical to preserve the full set of possible states of the microprocessor when the microprocessor shifts over to its standby mode. Therefore, it is necessary to bring the microprocessor to a known state when entering standby mode.

Normally, when it is desired to put a microprocessor into a known state, this is done by activating a reset. Some microprocessor architectures have reset lines running to every resettable storage element on the chip, so that a reset command will instantly reset every logical element to a known state. However, some architectures do not. For example, in the Intel 8051 architecture, several cycles are necessary after the reset command, to clock all of the logical elements on the chip into the known state. (This architecture is used not only in Intel's 80C51 microprocessor, but also in any other microprocessor which is to be compatible with this widely-used architecture). For example, a simple example of a logic block which would require multiple cycles to reset would be a shift register, with a reset only at the input of the shift register. In this (hypothetical) case, it can be seen that, even after the reset command has provided a known state in the first stage of the shift register, unknown data may still exist in the following stages. Therefore, a series of clock commands must be provided, to propagate the known state all the way through the shift register.

Many microprocessor architectures of interest will have some sequential logic on chip. This sequential logic may not necessarily be provided with sufficient reset lines to reset all of it in one step. However, note that this creates problems in bringing a battery-backed nonvolatile microprocessor to a known state on power-down.

Typically, a power supply smoothing capacitor will be provided on the board or elsewhere, so that the power supply voltage seen by the microprocessor will change with a moderately long time constant (e.g. of the order of milliseconds) when power goes down. Thus, a voltage comparator can detect when the power supply is crashing, in time for the microprocessor to execute a command sequence to enter the predetermined state.

However, the present invention teaches that, in order to do this reliably, the system clock should not be relied on. That is, when the power supply is crashing, the system clock may have already stopped by the time the comparator detects that the power supply is going down. Thus, the system clock cannot be relied on to perform the additional clocking to place the microprocessor in the known state.

In the present invention, an on-chip clock is provided to generate the additional clock cycles needed after reset to enter the known state. Clock intercept logic is also provided, to disconnect the system clock when the power-down sequence is entered, and activate the internal clock.

The internal clock generation circuitry need only clock the internal circuitry sufficiently accurately to converge on the predetermined logic state. Thus, the internal clock generator can be made relatively simple. Thus, the present invention provides a microprocessor which can reliably retain all the data in its internal memory during power-down status for extremely long time periods.

As noted, microprocessor architectures which provide single-step full entry into the reset phase do not require as elaborate operations to enter a predetermined state at power-down. However, a number of considerations favor architectures which do not provide this one-step reset: First, in the microprocessor industry, compatibility is an absolutely crucial issue. Several well-accepted current microprocessor architectures require multi-step reset operations. Second, many useful circuit blocks are inherently multi-phase state machines, and the ability to use such circuitry without adding a plethora of reset lines makes the layout easier and more compact. Third, in designing programmable logic, the metal layout is much simpler if it is not necessary to provide reset lines to every latch on the chip. That is, for a fully one-step reset operation, a reset line must be provided to precondition every single latch on the chip. There are a great many such latches.

Alternatively, if it is necessary to save the state of a microprocessor entering power-down, this can be done separately. For example, a "shadow" memory or register can be used to track the status of various on-chip registers, etc. Similarly, if desired, portions of on-chip memory can even be used as "shadow" scratch pad, to preserve some state information during such power-down operations.

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

The numerous innovative teachings of the present application will be described with particular reference to the presently preferred embodiment, wherein these innovative teachings are advantageously applied to the particular problems of an 8051-compatible microcontroller. However, it should be understood that this embodiment is only one example of the many advantageous uses of the innovative teachings herein. For example, the innovations disclosed herein can optionally be adapted to other complex logic devices which do not have a one-step reset available. In general, statements made in the specification of the present application do not necessarily delimit any of the various claimed inventions. Moreover, some statements may apply to some inventive features but not to others.

Figure 6B:
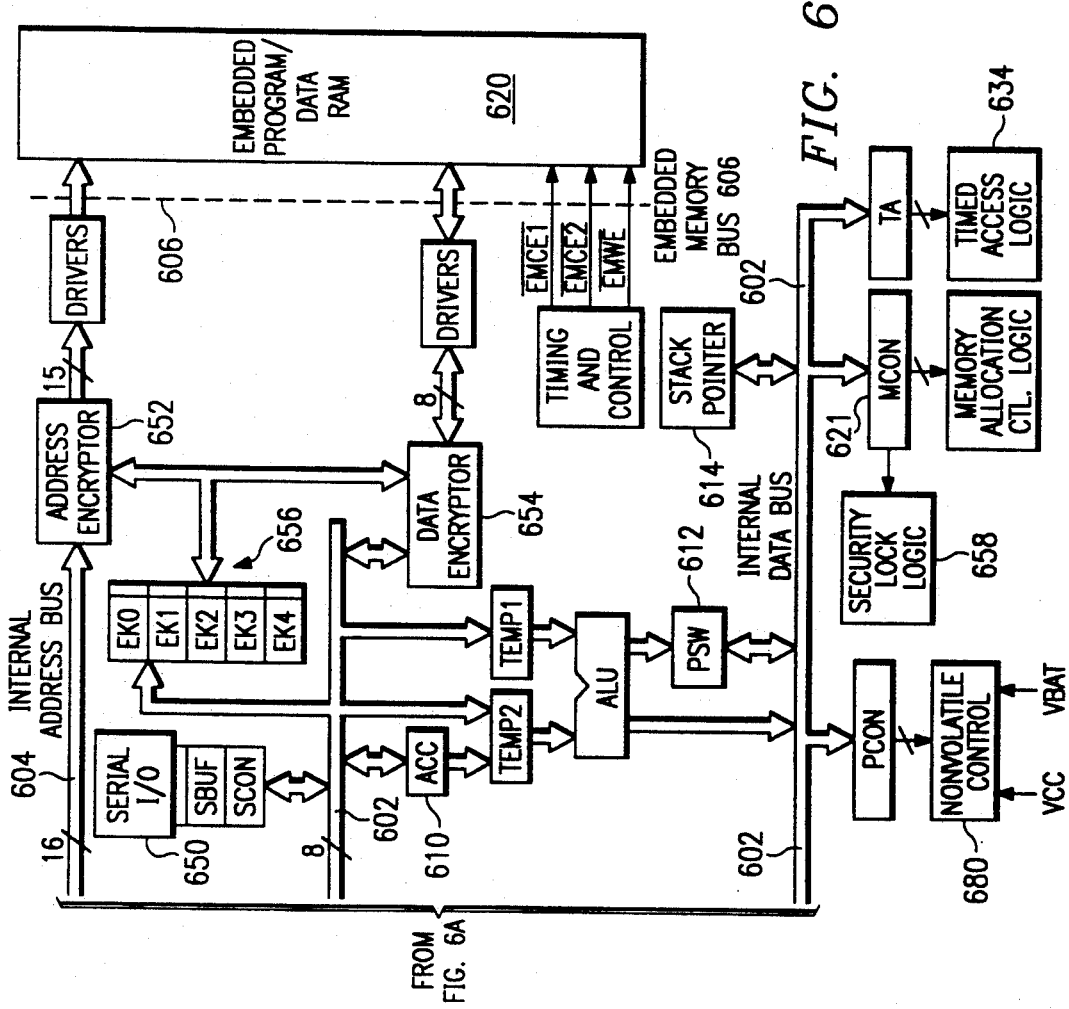
FIGS. 6A and 6B together show an overview of the architecture of the microcontroller of the presently preferred embodiment.
Figure 6A:
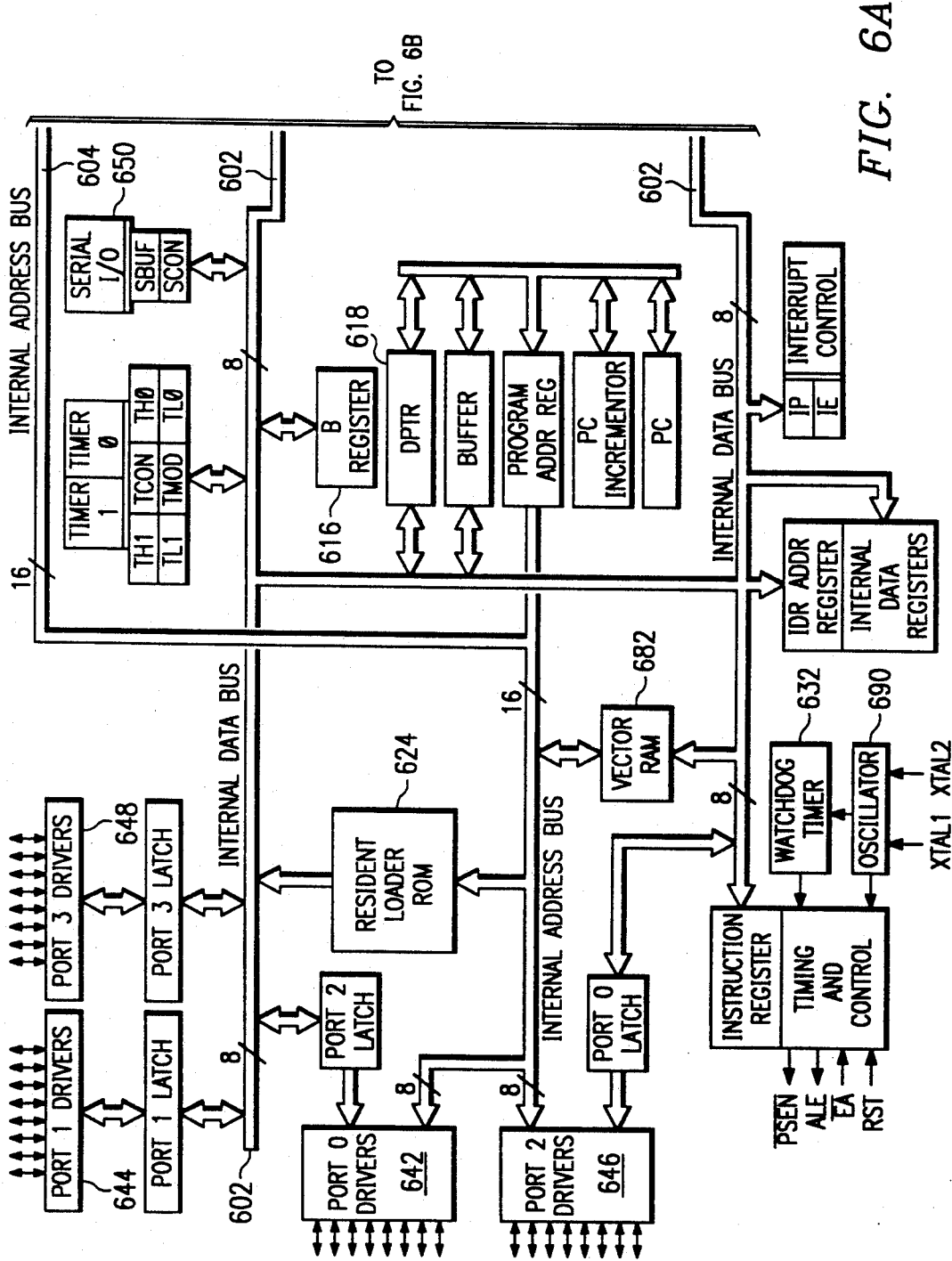

FIG. 6 is a block diagram (in two parts, labelled 6A and 6B) which illustrates a conceptual model of the internal architecture of the microcontroller of the presently preferred embodiment. Significant features of this general architecture will now be discussed. However, it should be noted that the innovative teachings disclosed can be used in a wide variety of microprocessor architectures (or in other complex random logic), and are not limited to the specific family of 8051-compatible architectures.

BUS ORGANIZATION: There are four major busses implemented which are relevant in developing an understanding of the operation of the device. There are the Internal Data Bus (602), the Internal Address bus (604), the Embedded Memory Bus (606), and the external Expanded Bus. All addresses and data which are transferred during program execution are passed on the Internal Address and Data Busses (602, 604). User Program and Data Memory is always accessed form with the embedded Program/Data Ram (620) or from external memory located on the Expanded Bus.

The microcontroller of the presently preferred embodiment uses the Embedded Memory Bus for access to Embedded Program/Data RAM in the same fashion as an 8051 Family device would access Internal ROM or EPROM memory. This bus is physically separate from the Expanded Bus, which if used, replaces Port 2 and Port 0 pins.

CPU REGISTERS: All of the CPU registers are mapped as Special Function Registers (SFR'S) and are identical in number and function to those present within the 8051. These registers are described briefly below.

ACCUMULATOR: The Accumulator (A) 610 is used as either a source or destination register in all arithmetic instructions. It may also be used in most other types of instructions.

STACK POINTER: The Stack Pointer (SP) 614 is an 8-bit register which is used to mark the location of the last byte of data stored in the stack. The stack itself may be located anywhere in the on-chip 128-byte Data Register area. The Stack Pointer preincrements during a stack write and post-decrements during a stack read.

B REGISTER: The major function of the B register 616 is as a source and destination register during multiply and divide instructions. It may also be used as a scratchpad register in other types of instructions.

PROGRAM STATUS WORD: The Program Status Word (PSW) 612 contains status flags which are set according to the results of a previously executed instruction. In addition, the PSW contains the register bank select bits.

DATA POINTER: The Data Pointer (DPTR) 618 must be used to access Data Memory which may be mapped into embedded Program/Data RAM or onto external memory devices on the Expanded Bus. It is accessed by the user's program as either two 8-bit Special Function Registers or as a 16-bit register with certain instructions.

SERIAL I/O: The on-chip serial I/O port 650 is comprised of a receive data buffer, a transmit data buffer, and a control register. Both the received data buffer and the transmit data buffer are accessed in a single location (SBUF) in the Special Function Register map. The control register (SCON) is accessed in a separate location. When the serial I/O function is enabled two external I/O pins (P3.0, P3.1) are reassigned in hardware to serve the transmit and receive data functions.

PROGRAMMABLE TIMERS: Two 16-bit programmable timers are included which can perform various timing and counting functions. A total of four registers (TH1, TL1, TH0, and TL0) access the upper and lower halves of each of the two timer/counters. A single control register (TCON) is used to select the various operating modes of the two times. Two external I/O pins (P3.4, P3.5) may be programmed to serve as external counter inputs, one pin for each of the two timer/counters.

PARALLEL I/O: Four SFR's provide access for the latches of the four parallel I/O ports 640, 642, 644, and 646. A total of 32 bits of parallel I/O is available through these I/O ports. However, up to 18-bits are sacrificed when the Expanded Bus Mode is used to interface to external memory and up to 6-bits may be sacrificed if any external interrupt inputs, timer counter inputs, or serial I/O functions are used.

EMBEDDED PROGRAM/DATA RAM: The Embedded Program/Data RAM area 620 is accessed by the microcontroller of the presently preferred embodiment via the Embedded Memory Bus 606. Current versions of the microcontroller of the presently preferred embodiment incorporate either 8 Kbytes or 32 Kbytes in this area. On-chip logic allows this memory to be partitioned by the application software into variable portions of Program Memory or Data Memory to suit the current needs of the application. This partitioning function is performed via the MCON Special Function Register 621.

Ports 0 and 2 (642 and 648) may be selected to serve the alternate function of an Expanded Bus which provides address, data, and control signals for interface to external memory in the event the external memory is required for the application in addition to the embedded RAM. In the Expanded Bus Mode, up to 64 Kbytes of Program Memory and 64 Kbytes of Data Memory may be accessed through the Expanded Bus.

NONVOLATILE CONTROLLER 680: This feature provides the crashproof operation of the microcontroller of the presently preferred embodiment, by maintaining the contents of the embedded Program/Data RAM in the absence of VCCI, using a self-contained lithium energy source. (The power monitor and clock intercept circuitry described in detail below is part of this controller.) The logic provided includes the Power fail Warning interrupt detection and generation, Automatic Power Down, and Power On Reset. As a result, the Embedded Program/Data RAM may be modified whenever necessary during execution of the user's software but will remain unchanged when $V_{cc}$ is absent. The controller also maintains the Internal Data RAM and certain Special Function Registers to be preserved during a power down condition (when VCCI=0 V).

SOFTWARE ENCRYPTION LOGIC: The software security circuits within the microcontroller of the presently preferred embodiment include the Address Encryptor 652, the Data Encryptor 654, and the Encryption Key registers 656 (EKO-4). When the device is operating in the Encryption Mode and executing code from the embedded Program/Data RAM, the Address Encryptor is used to transform "logical" addresses which appear on the Embedded Memory Bus to the RAM. Similarly, the Data Encryptor transforms data on the Internal Address Bus into encrypted data during write operations on the Embedded Memory Bus. When data is read back, the Data Encryptor restores it to its true value. Although each encryptor uses its own algorithm for encrypting data, both depend on the 40-bit key word which is contained in the Encryption Key registers (EKO-4).

SECURITY LOCK LOGIC 658: The Security Lock logic prevents a read or write to an Internal Register or Embedded Program/Data RAM location during a Program Load Mode operation. In addition, it inhibits the device from operating in the Expanded Bus Mode. By disabling access to key internal resources, this feature precludes unauthorized disassembly of application software contained in Embedded Program/Data RAM.

VECTOR RAM 682: The Vector RAM is used to contain the reset and interrupt vector code when the microcontroller of the presently preferred embodiment is operating in the Encryption Mode. This feature is included to insure the security of the application software.

TIMED ACCESS LOGIC 634: The Timed Access logic is used to protect against inadvertent changes to configuration parameters and to the Program RAM in the event of a loss of software control. The protected configuration parameters include the Partition Address bits in the MCON register, the Security Lock bit, as well as the Enable Watchdog Timer bit, Stop Mode bit, and Power-On-Reset bit in the PCON register.

WATCHDOG TIMER: When the user's software is being executed, the Watchdog Timer 632 can be used to automatically restart the processor in the event that software control is lost. This time is also used to generate a delay during an oscillator start-up condition, which allows the clock frequency to stabilize. This occurs during reset cycles that follow a time in which the oscillator has been stopped (Stop Mode Reset and Power On Reset).

RESIDENT LOADER ROM: The Resident Load ROM contains firmware which controls the initial loading of the nonvolatile Embedded Program/Data RAM. The firmware provides Parallel Program Load operation which can operate with 8751 compatible EPROM programmers. In addition, the firmware facilitates Serial Program Load operation via the on-chip serial port 650. The Internal ROM is not accessible by the user and performs the loading function only when the device is strapped for operation in the Program Mode.

NONVOLATILE CONTROL: The on-chip nonvolatile control circuitry automatically places the microcontroller in its Data Retention State in the absence of $V_{cc}$. It insures that the proper internal control signals are generated and that power from the embedded lithium battery cell is applied at the proper times so that the Embedded Program/Data RAM and data in the nonvolatile Internal Registers remain unchanged when $V_{cc}$ is cycled on and off. In addition, an interrupt is available for signaling the processor of an impending power fail condition so that the operational state of the processor can be saved just prior to entering the nonvolatile state. $V_{cc}$ is monitored by the nonvolatile control circuity for three voltage thresholds below nominal operating voltage. These thresholds are identified as $V_{PFW}$ (Power Fail Warning voltage), $V_{CCmin}$ (minimum operating voltage), and $V_{BAT}$ (battery supply voltage). These thresholds are used to initiate required action within the microcontroller during situations when $V_{cc}$ power is cycled on and off.

Figure 4:
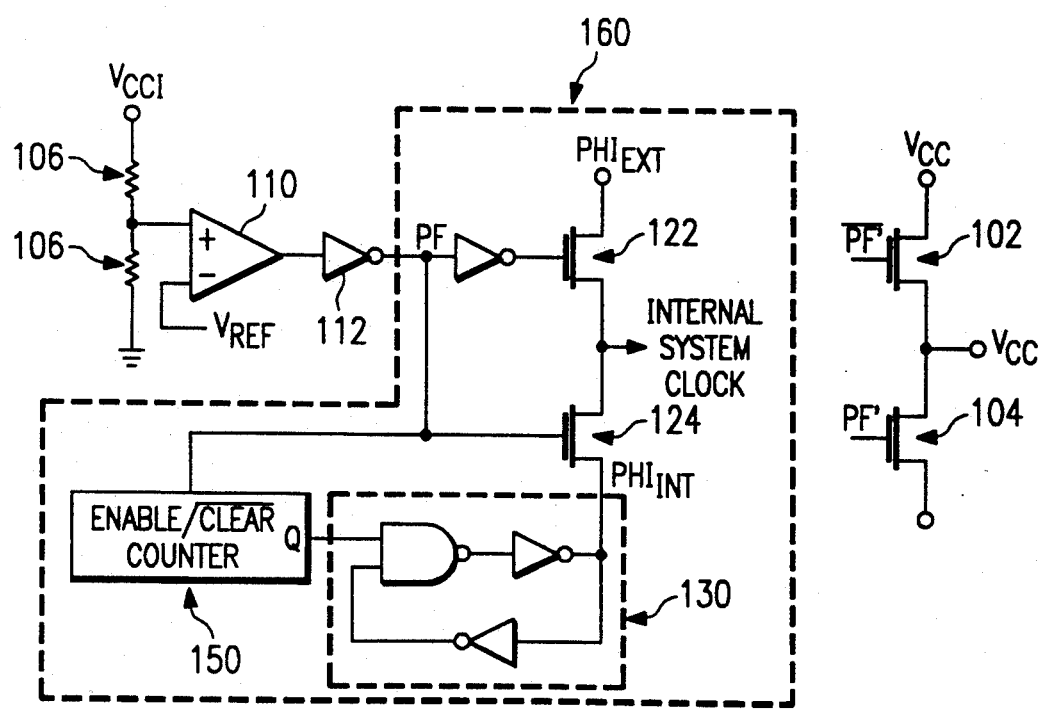
FIG. 4 schematically shows the logic used to switch the on-chip power supply and clock generation functions, in the presently preferred embodiment.

FIG. 4 shows key portions of the logic used to implement the power-down reset functions, in an alternative embodiment of the present invention. This embodiment corresponds to the presently preferred embodiment, except that some of the circuits shown in FIG. 4 are somewhat simpler than the circuits actually used in the invention as presently practiced. These differences, together with many features which do apply to the presently preferred embodiment, are noted in the following description.

A comparator 110 compares the voltage of system power supply VCCI to the reference voltage $V_{REF}$. Scaling resistors 106 are used to accommodate the voltage magnitudes actually used. In this embodiment, voltage $V_{REF}$ is a bandgap-derived level of about 2.7 Volts. (In the invention as presently practiced, a separate reference voltage $V_{REF}$ source is not used. However, it is contemplated that it might be desirable to introduce a bandgap-derived reference voltage source in the future.) The output of comparator 110, buffered by one or more inverter stages 112, provides a logical signal PF which indicates whether power has failed.

This logical signal PF is used in several ways. First, a signal (shown as PF-bar-prime), which is equivalent to the logical complement of a delayed version of signal PF, is connected to control the gate of transistor 102. This causes transistor 102 to be turned off when PF goes high, thereby disconnecting the on-chip power supply line $V_{cc}$ from VCCI. Similarly, the gate of transistor 104 is controlled by a signal PF', which is equivalent to a delayed version of PF. This causes the internal power supply line $V_{cc}$ to be connected to the battery voltage $V_{BAT}$ when PF goes high. (In the presently preferred embodiment, switching transistors are actually implemented using PMOS devices, as will be discussed below.)

The power fail signal PF can also be latched, to produce an on-chip reset signal $RESET_{Int}$. This is connected to the reset lines which run across the integrated circuit, so that a high level of signal $RESET_{Int}$ will initiate a reset in the logical elements on the chip. The $RESET_{Int}$ signal is preferably held high during all the time when the system power supply VCCI is down.

The power fail signal PF also controls the selection of a source for the internal system clock. This function is performed by the clock intercept logic 160. The general use of clocks on-chip will be described, and then the operation of the clock intercept logic 160 will be described in detail.

The microcontroller of the presently preferred embodiment includes an on-chip oscillator circuit 690, which may be driven either by using an external crystal (at connections XTAL1, XTAL2) as a time base, or from a TTL-compatible clock signal. The oscillator 690 provides the signal referred to here as $phi_{Ext}$, and this signal provides the internal system clock signals. The internal system clock is divided down to produce the necessary clock phases, state times, and machine cycles (which define the sequential execution of instructions). In the presently preferred embodiment, the internal system clock has a frequency of about 12 MHz. This signal is divided by two, to produce a signal indicating state times, and then divided by 6 to produce a signal indicating machine cycles. In addition, numerous other clock signals are generated, with phase shifts and on and off times adapted to particular control needs. Once an internal system clock has been provided, using the innovative circuitry disclosed, the use of other circuitry to generate various derived clock signals may be implemented in any of the many ways which are all well known to those skilled in the art.

When power fail signal PF is high, transistor 122 is turned off and transistor 124 is turned on. This disconnects the internal system clock line from the external clock $phi_{Ext}$, and instead connects the internal system clock line to the output $phi_{Int}$ of a local oscillator 130. (The external clock $phi_{Ext}$ may be generated by an on-chip oscillator 960 using a crystal which is external to the microprocessor, or by following an external clock received from an off-chip oscillator. However, note that the ring oscillator 130 is not crystal-controlled, since this frequency source does not have to have as much precision.)

A counter 150 receives the power fail signal, and also receives clock pulses derived from the operation of the ring oscillator 130. This counter is initially loaded with a number corresponding to the predetermined number of clock pulses which are needed to assure reaching the known state. Thus, the output of this counter is connected to cut off the oscillator 130 after a predetermined number of pulses have been generated.

The local oscillator 130 is shown as a very simple ring oscillator, which merely includes three inverters. However, as will be readily recognized by those skilled in the art, a wide variety of other circuits could be used to generate a pulse train internally. For example, it would be possible to use a longer ring oscillator, or a ring oscillator whose elements were not simple inverters, or a state machine which was not a simple ring oscillator.

In the presently preferred embodiment, using an 8051-compatible architecture, the counter 150 is programmed so that 32 pulses occur on the internal system clock line after the power-fail signal PF goes high. (This corresponds to slightly less than three machine cycles.)

In the presently preferred embodiment, the signal used to control transistors 102 and 104 is not merely a delayed version of signal PF, but actually is obtained by using another comparator, to test the external supply voltage VCCI against another voltage threshold. Thus, as the system supply voltage is falling, the two comparators will trigger at different times. This embodiment, using multiple comparators in place of comparator 110, will be discussed in detail below.

Figure 5:
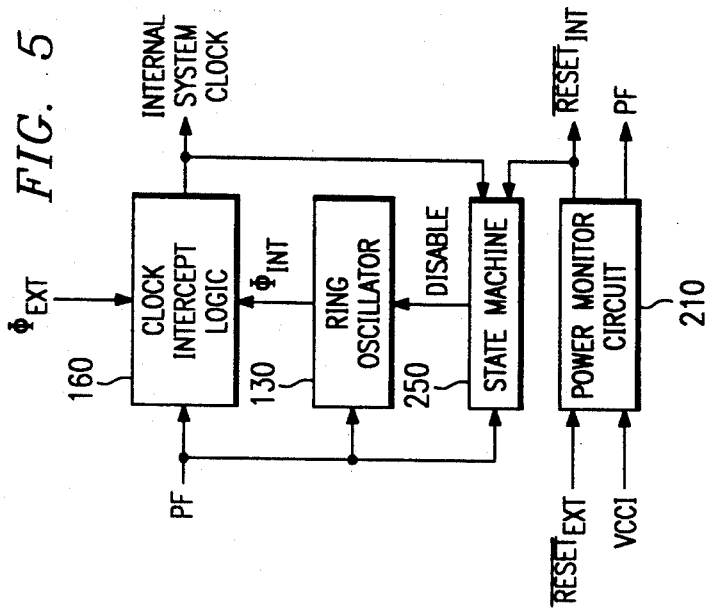
FIG. 5 is a higher-level representation of portions of the circuits of FIG. 1 and FIG. 4.

FIG. 5 shows a higher-level view of the clock control functions performed by the presently preferred embodiment. Note that a state machine 250 is shown in place of the counter 150. Note also that a power monitor circuit 210 is shown in place of comparator 110. This represents the additional circuitry which is used, in the presently preferred embodiment, to generate the on-chip reset signal $RESET_{Int}$ and other signals, in accordance with changes which may occur in the level of the system power supply. Signal $RESET_{Int}$ is dependent not only on the internal power-fail detect signal PF, but also on the externally-received reset signal $RESET_{Ext}$.

The operation of this power monitor circuit 210 will now be described in greater detail, with reference to FIGS. 1, 3A, and 3B. Note that the circuit shown in FIG. 1, unlike that shown in FIG. 4, does not use a separate reference voltage $V_{REF}$. Instead, the battery voltage $V_{BAT}$ is used as a reference voltage, and power failure is detected with reference to voltage $V_{BAT}$.

In the embodiment of FIGS. 1–3B, three comparator circuits are used to monitor the power supply voltage. All three of these comparators use a backup battery voltage $V_{BAT}$ as a reference to the negative input of the comparators. Comparator 32 compares the external power supply voltage VCCI to the backup battery voltage $V_{BAT}$.

The output of comparator 32 provides a signal which is used to control transistors 14, 18, and 28, which switch the on-chip supply voltage $V_{CC}$ and the memory supply voltage VCCO. (Note also that the battery voltage input $V_{BAT}$ is separated from the on-chip supply voltage line only by diode 24 (and resistors), but not by any switching transistors. This avoids any accidental forward biasing of junctions in the substrate.) The additional terminal VCCO is used, in the presently preferred embodiment, to provide a power supply voltage to a memory chip which is packaged together with the logic chip. (This memory is shown as embedded program/data RAM 620, in FIG. 6.) Transistor 14 connects the external supply VCCI to the memory supply voltage VCCO during normal operation. Transistor 18 connects the external supply VCCI to the on-chip power supply line $V_{cc}$ during normal operation. Transistor 28 connects the internal power supply voltage $V_{cc}$ to the memory supply voltage VCCO during power-down standby mode.

All three of the comparators 32, 34, 36 compare $V_{BAT}$ to some fraction of the external supply voltage VCCI. Comparator 32 sees the system power supply voltage VCCI directly. Comparator 34 receives a voltage which is equal to VCCI multiplied by $(R_{40}+R_{42})/R_{38}+R_{40}+R_{42})$, where $R_{38}$ represents the resistance of resistor 38. Comparator 36 receives VCCI multiplied by $(R_{42})/R_{38}+R_{40}+R_{42})$. Thus, as the system power supply VCCI declines (during a power failure), comparator 36 will cross zero first, and then comparator 34, and then comparator 32. The comparators will trigger in the opposite sequence when power is being restored.

In the presently preferred embodiment (where the external power supply voltage VCCI is specified as +5 volts ±5%, and the battery backup voltage is specified as +3 volts), comparator 36 switches its output or trips when the VCCI declines to +4.75 volts (assuming that the backup battery voltage $V_{BAT}$ is +3 volts). When the external power supply voltage drops below +4.75 volts, the output of comparator 36 sets a flag consisting of a latch circuit which is ANDed with the output of a power fail interrupt mask latch circuit, and if both outputs of these latch circuits are positive, the AND gate causes interrupt logic to interrupt the current operation of the microcontroller or microprocessor and to vector to a predetermined address in the program memory. Thus, comparator 36 generates an early warning of power failure. This warning may be used, for example, to save internal logic states, or debugging aids, in memory.

Comparator 34 switches (in the presently preferred embodiment) when the external supply voltage VCCI drops below +4.5 volts. The output of this comparator is used to generate the internal reset signal $RESET_{Int}$.

In the preferred embodiment, the integrated circuit chip containing the microcontroller also has a power supply output terminal which can be used to supply power to another integrated circuit, for example, a static RAM. The external power supply is connected to this power supply output terminal when the external power supply voltage is above the battery voltage. When the external power supply voltage is below the battery voltage, the external power supply is isolated from the power supply output terminal. An internal signal generated by the microcontroller controls whether the backup battery voltage is coupled to this power supply output terminal when the external power supply is interrupted. This permits the user to program in an option of whether to preserve the data stored in the static RAM, or to isolate the backup battery from the power supply output terminal under conditions in which it is not necessary to retain the data stored in the static RAM when the external power supply is interrupted.

The power monitoring logic used in the preferred embodiment is also responsive to an input signal CBC, which causes comparators 32 and 34 to operate at reduced bias current (and reduced slew rate capability). The same signal is used to completely disable comparator 36, thus saving the current normally drawn by this comparator. This reduced power state may advantageously be invoked when it is desired to minimize the power required by the microcontroller under conditions in which the reduced slew rate of the first two comparators is acceptable, such as in the battery-backed standby mode.

Figure 1:
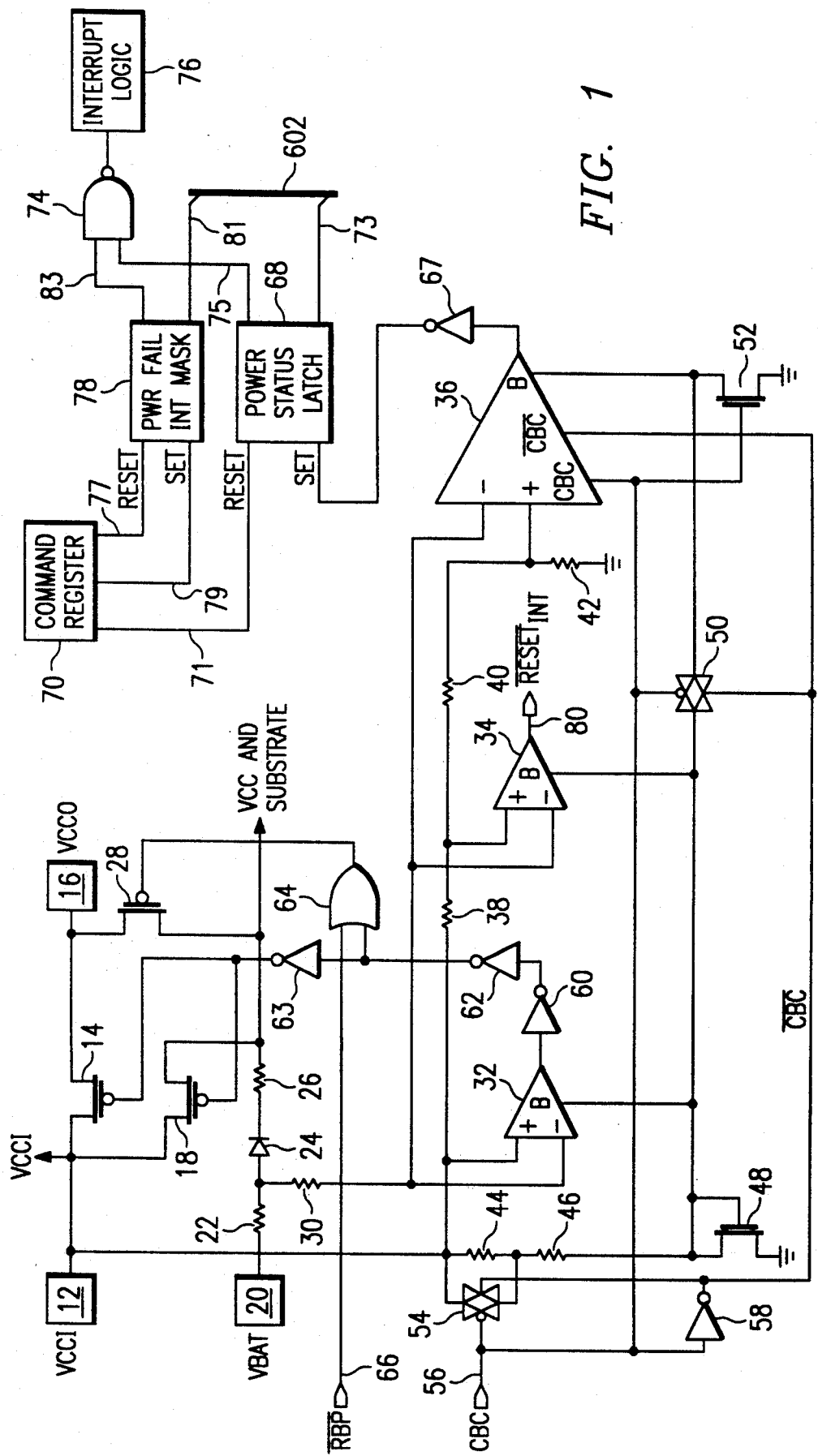
FIG. 1 is a schematic diagram of comparators and some other logic portions used to control the on-chip reset signal, in an innovative circuit like that of FIG. 4.

In FIG. 1, input terminal 12 is connected to an external power supply voltage VCCI. The VCCI node is connected, through a p-channel transistor 14, to a power supply output terminal 16 (also labelled VCCO). The VCCI node is also connected to the source of a second p-channel transistor 18. A backup battery voltage $V_{BAT}$, from a lithium battery packaged together with the integrated circuit, is received at input terminal 20. The backup battery input terminal 20 is connected through resistor 22 to the anode of a diode 24. The cathode of this diode is connected, through resistor 26, to provide the supply voltage $V_{cc}$ for the integrated circuit logic chip. (The internal power supply $V_{cc}$ is widely routed on-chip.) The internal power supply line $V_{cc}$ can be connected, through p-channel transistor 18 to the external power supply voltage VCCI. Another p-channel transistor 28 permits the internal power supply line $V_{cc}$ to be connected to the memory power supply output VCCO. The anode of diode 24 is also connected, through another resistor 30, to the negative inputs of three comparator circuits 32, 34, and 36.

The VCCI node is connected to the positive input of the comparator 32. The positive input of comparator 32 is connected, through resistor 38, to the positive input of the comparator 34. The positive input of the comparator 34 is connected, through resistor 40, to the positive input of the comparator 36. The positive input of the comparator 36 is grounded through another resistor 42. Thus, the resistors 38, 40, and 42 implement a voltage-dividing network, as described above, which has three different trip points.

The VCCI node is also connected, through resistors 44 and 46 and n-channel transistor 48, to ground. The drain and gate of the n-channel transistor 48 are commonly connected to the B or bias inputs of the comparators 32 and 34, and through a transmission gate 50 to the B or bias input terminal of the comparator 36 and to the drain of an n-channel transistor 52.

Another transmission gate 54 is connected in parallel with the resistor 44, and has a p-channel gate terminal connected to a comparator bias control (CBC) control signal 56. The CBC signal line 56 is also connected, through inverter 58, to a p-channel gate terminal of the transmission gate 50, to the CBC input of the comparator 36, and to the gate of the n-channel transistor 52. The output of the inverter 58 forms a signal CBC-bar which is connected to the n-channel gate terminal of the transmission gate 54, to the n-channel gate terminal of the transmission gate 50, and to the CBC-bar input of the comparator 36.

The output of the comparator 32 is connected, through inverters 60 and 62, to the input of an OR gate 64 and to the input of inverter 63. The output of the inverter 63 is connected to the gates of the p-channel transistors 14 and 18. The second input of the OR gate 64 is connected to a RAM battery power control signal input (RBP-bar, received on line 66), and the output of the OR gate 64 is connected to the gate of the p-channel transistor 28.

The output of the comparator 34 is connected to provide signal RESET$_{Inr}$-bar, on reset signal line 80.

The output of the comparator 36 is connected, through inverter 67, to the set input of a power status latch 68. The reset input of the power status latch 68 is connected (via a line 71) to an on-chip command register 70. One output of the power status latch 68 (on line 73) is connected to data bus 602. Another output of the power status latch 68 (on line 75) is connected to one input of a NAND gate 74. The output of the NAND gate 74 is connected to the input of an interrupt logic circuit 76. The command register 70 is also connected (via line 77) to a power fail interrupt mask latch 78. Another line 79 also connects the command register 70 to the set input of the power fail interrupt mask latch 78. A first output of the power fail interrupt mask latch 78 (on line 81) is connected to the data bus 602, and a second output of the power fail interrupt mask latch 78 (on line 83) is connected to a second input of the NAND gate 74.

Figure 2:
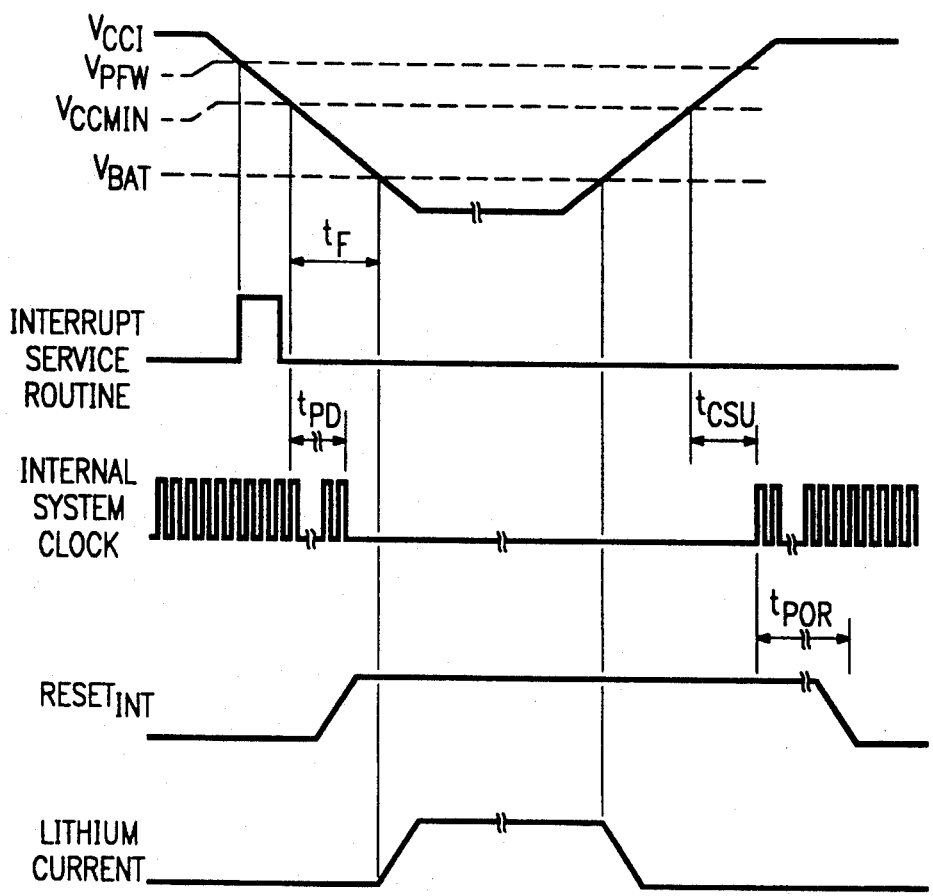
FIG. 2 is a voltage diagram illustrating the trip points of the three comparator circuits shown in FIG. 1.

FIG. 2 shows some of the significant events in the transition into and out of standby mode.

When $V_{cc}$ has been present for some time, program execution proceeds as normal. If $V_{cc}$ should decay from its nominal operating voltage and drop to a level below the $V_{PFW}$ threshold, then the internal PFW status flag (PCON.5) will be set. In addition, a Power Fail Warning interrupt will be generated if it has been enabled via the EPFW control bit (PCON.3). The purpose of these indicators is to warn the processor of a potential power failure.

The $V_{PFW}$ threshold is above the specified minimum value for $V_{cc}$ ($V_{CCmin}$) for full processor operation. The $V_{PFW}$ threshold is selected such that with a reasonable power supply slew rate, ample time is allowed for the application software to save into nonvolatile registers or RAM all critical information which would otherwise be lost in the absence of $V_{cc}$. Such information may include the states of the Accumulator, Stack Pointer, Data pointer, and other Special Function Registers which must be initialized with a reset when $V_{cc}$ voltage is applied once again. Through the use of the Power Fail Warning Interrupt, an orderly shutdown of the system may be performed prior to the time that processor operation is halted int he event that $V_{cc}$ voltage is removed entirely.

The PFW flag is set whenever the current $V_{cc}$ level is below the $V_{PFW}$ threshold. It is cleared in one of two ways: 1) a read of the PFW bit form software, or 2) a Power On Reset. If $V_{cc}$ is still below the $V_{PFW}$ threshold when the bit is cleared, then the PFW bit will be immediately set once again. An interrupt will be generated any time that both the EPFW bit and the PFW flag are set.

DATA RETENTION: If $V_{cc}$ voltage should fall below the $V_{CCmin}$ threshold, the nonvolatile controller will automatically cause processor operation to cease. This is done by first placing the CPU in a reset condition and then halting the operation of the internal clock oscillator circuit, as illustrated in the timing diagram in FIG. 2. At this point the interface to the Embedded Program/Data RAM is disabled by pulling the CE* line high. This action guarantees an orderly shutdown for the battery-backed CMOS RAM. Also at this time all output drivers on the 40 80C51 compatible pins are disabled and allowed to float. In order to prevent excessive battery current drain while in the Data Retention State due to floating pins, all inputs on these 40 pins are also disabled when $V_{cc}$ voltage is below the $V_{CCmin}$ threshold.

If $V_{cc}$ voltage drops below $V_{BAT}$, then the microcontroller is automatically placed in the Data Retention State. The control circuity accomplishes this by switching the internal power supply line ($V_{cc1}$) from the $V_{cc}$ pin to the Embedded lithium power source. The designer should insure that the $V_{cc}$ slew rate time from $V_{CCmin}$ to the maximum battery voltage ($V_{Limax}$) is met. This is required to allow the internal control circuity to perform an orderly reset and shutdown of the CPU before the battery supply is switched on. If this specification is not met, then an excessive amount of current can be drawn from the battery supply while the shutdown activities are being performed, since this takes place with the internal clock running. This specification can be easily met if a reasonable amount of power supply capacitance is tied to the $V_{cc}$ pin.

When $V_{cc}$ voltage eventually goes above the $V_{CCmin}$ threshold, the clock oscillator is allowed to start up, and an Internal Power On Reset cycle is executed. Part of the cycle involves a considerable delay that is generated to allow the clock oscillator frequency to stabilize. Activity on the RST pin is ignored until this sequence is completed. The time required for this cycle is shown as $t_{POR}$ in FIG. 2, and is specified in the AC Electrical Specifications. A detailed description of the Power On Reset cycle operation is given in Section 9.

Typically, the time taken for the Power On Reset cycle will be longer to complete than it takes for $V_{cc}$ to rise over the $V_{PFW}$ threshold. In this case the internal PFW flag will be reset before execution of the user's program begins, as illustrated in FIG. 5-2. If the Power On Reset cycle completes before $V_{cc} > V_{PFW}$, then PFW will be set again as a result of $V_{cc} < V_{PFW}$ during user software exectuion. A Power Interrupt will occur at this time if the EPFW bit is enabled.

PARTIAL POWER FAILURES: Two cases of partial power failure can occur in which $V_{cc}$ voltage does not go through a complete power fail cycle as described above. The first case is that in which $V_{cc}$ drops below the $V_{CCmin}$ threshold and then returns to its nominal level without going below the $V_{BAT}$ threshold. The second case is that in which $V_{cc}$ drops below the $V_{PFW}$ threshold and then returns to its nominal level without going below the $V_{CCmin}$ threshold. Both of these case are very possible in a system application, and could be caused by a noise spike or a "brownout" condition on an AC power line.

The first case is indistinguishable by the software from the complete power fail cycle which was previ7 ously described. When $V_{cc}$ drops below $V_{PFW}$ the PFW flag will be set, and the clock oscillator will be stopped when $V_{cc}$ drops below $V_{CCmin}$. The only operation difference is that if $V_{cc}$ never drops below the $V_{BAT}$ threshold the internal power supply line will never be switched over the cell. When $V_{cc}$ rises back above the $V_{CCmin}$ threshold, the Power On Reset Cycle will be executed as before. As a result, no special processing is required in software to accommodate this case.

In the second case the PFW flag will be set and a Power fail Warning interrupt will still occur when $V_{cc}$ drops below the $V_{PFW}$ threshold. The PFW flag will remain set until it is cleared by either a read of the flag by the software or by a power on reset cycle. If it is cleared while $V_{cc}$ is still below the $V_{PFW}$ threshold, it will be immediately set again. If it is cleared after $V_{cc}$ has risen back above the $V_{PFW}$ threshold, then it will remain cleared until the next time $V_{cc}$ goes below $V_{PFW}$.

As long as the PFW flag is set an interrupt condition is defined if EPFW is set. If the software executes a service routine in response to PFW interrupt and exits the service routine with the PFW flag still set, then the processor will be immediately interrupted again. In a typical application, however, the Power Fail interrupt service routine would test the PFW flag in a conditional loop to determine if $V_{cc}$ has risen back above $V_{PFW}$, and would then return control to the main program in response to this event.

When the external power supply voltage VCCI is greater than +4.75 volts ($V_{PFW}$), then the positive inputs of the comparators 32, 34, and 36 will all be greater than the negative inputs of these comparators, and the output of each of the comparators 32, 34, and 36 will be at a logical 1 (high) level.

The logical 1 level on the output of the comparator 32 produces a logical 1 level at the output of the inverter 62. This forces the output of the OR gate 64 to be high, which turns off the p-channel transistor 28. This output of the inverter 62 is also inverted by inverter 63, to turn on the p-channel transistors 14 and 18, so that VCCI is connected to $V_{cc}$ and to VCCO. Since the VCCI is greater than $V_{BAT}$ under these conditions, the diode 24 is reverse-biased, so that $V_{BAT}$ is isolated from $V_{cc}$.

The logical 1 level at the output of the comparator 34 on the RESET$_{INT}$-bar line 80 does not initiate the reset or standby condition of the microcontroller. Thus, the microcontroller continues to operate normally.

The logical 1 level on the output of the comparator 36 is inverted by the inverter 67 to hold the set input to the power status latch 68 at a logical 0 level. Both outputs of the power status latch 68 will be a logical 0 level if the command register 70 has reset the power status latch 68 after the last power interrupt, and will be a logical 1 level if it has not been reset. The output line 73 of the power status latch 68 can be read under software command from the data bus 602. If the power status latch 68 has been reset, then the output of the NAND gate 74 will be a logical 1 level, so that the interrupt logic 76 is not caused to generate an interrupt. (If an interrupt were generated by this logic, this could be used, as noted above, to cause the microcontroller to vector to a predetermined memory address to execute a routine in response to a power-fail-warning).

During normal operation the CBC signal on line 56 is a logical 0 level, which makes conductive the transmission gates 50 and 54 and, as will be discussed in detail below, allows the comparator 36 to operate similarly to comparators 32 and 34. Under these conditions, the resistor 46 and the n-channel transistor 48 form a current source which is mirrored into the comparators 32, 34, and 36 as a bias current control voltage, and the comparators 32, 34, and 36 accordingly have a slew rate sufficient to track the changes in the external power supply voltage. When the CBC signal on line 56 is a logical 1 level, then the transmission gates 50 and 54 are nonconductive. This places the resistor 44 in series with the resistor 46, and therefore reduces the amount of current flowing through the n-channel transistor 48. This, in turn, is mirrored into the bias current for the comparators 32 and 34, and thereby reduces the amount of current drawn in each of the comparators 32 and 34. (The slew rate of these comparators is also reduced.) The nonconductive state of the transmission gate 50 combined with the conductive state of the n-channel transistor 52 pulls the bias input of the comparator 36 to ground potential. As described below, the logical 1 level on the CBC signal line 56 and the logical 0 level on the line CBC-bar causes the comparator 36 to cease operating as comparator and to force a logic 1 level at its output.

In the presently preferred embodiment, the microcontroller's programmable logic elements place a logical 1 level on the CBC signal line 56 when the microcontroller is in a stop mode, i.e., not processing data. Under these conditions the output of the comparator 36 is forced to a logical 1 level, to ensure that an interrupt will not be generated (since such an interrupt might be present when the microcontroller comes out of the stop mode).

When the external power supply voltage drops to below $V_{PFW}$(+4.75 volts) while the CBC signal line 56 is a logical 0 level, the output of the comparator 36 switches from a logical 1 level to a logical 0 level. This produces a logical 1 level at the set input of the power status latch 68. This action produces a logical 1 level at both outputs of the power status latch 68, which causes the output of the NAND gate 74 to go to a logic 0 level if the outputs of the power fail interrupt mask latch 78 are also a logical 1 level. This logical 0 level at the output of the NAND gate 74 causes the interrupt logic 76 to generate an interrupt, so that the program sequence will branch to a predetermined memory location in the instruction memory. (This could be used, for example, to begin a process to transfer the data in the registers to nonvolatile memory, so that the state of the microcontroller can be preserved and recovered following the interruption of the external power supply.) The output of the power fail interrupt mask latch 78 is a logical 0 or a logical 1, depending on whether the command register 70 has been instructed to set or reset the power fail interrupt mask latch 78. The output line 81 of the power fail interrupt mask latch 78 can be read by the microcontroller from the data bus line 72.

As VCCI declines further to below $V_{CCmin}$ (+4.5 volts), the output of the comparator 34 switches from a logical 1 to a logical 0 level, which activates reset lines all over the chip, and causes the microcontroller to go into a reset or low power state until the external power supply voltage again goes above +4.5 volts. At this time the transistors 122 and 124 will switched by clock intercept logic 160, as discussed above, to connect the internal system clock lines to the signal phi$_{Int}$ generated by ring oscillator 130 rather than signal phi$_{Ext}$ generated by crystal-controlled clock generator 690 (which uses an off-chip resonator or a system clock).

When the external power supply voltage drops below the battery voltage $V_{BAT}$, then the output of the comparator 32 switches to a logical 0 level. This provides a logical 0 at the output of the inverter 62. Under these conditions the output of the OR gate 64 will be a logical 0 level if the RBP-bar signal on line 66 is also a logical 0 level, and this in turn will enable the p-channel transistor 28 to provide battery power to the power supply output terminal VCCO (16). Thus, a logical 0 level on the RBP-bar signal line 66 will cause battery backup voltage to be supplied to the power supply output terminal 16 when the external power supply fails, and a logical 1 level on the RBP-bar signal line 66 will inhibit battery voltage from being passed to the power supply output terminal 16. The logical 0 level at the output of the inverter 62 is inverted by the inverter 63 to disable or make nonconductive the p-channel transistors 14 and 18. Under these conditions the diode 24 will become forward biased and the battery voltage will provide the supply and substrate voltage for the integrated circuit chip.

As VCCI is reapplied, the outputs of the comparators 32, 34, and 36 will switch in the reverse order as when the external power supply voltage was falling from +5 volts to ground. That is, the output of the comparator 32 will switch to a logical 1 level when the external power supply voltage goes above the backup battery voltage which will couple the external power supply input terminal 12 to the power supply output terminal 16 and to the supply and substrate of the integrated circuit chip. Also, the internal supply voltage lines and the substrate will be disconnected from the power supply output terminal 16 any time the external power supply voltage is above the backup battery voltage. As the external power supply voltage increases above +4.5 volts, the output of the comparator 34 will become a logical 1 level to allow the microcontroller to operate normally. As the primary source switches above the +4.75 volt level, the output of the comparator 36 will switch from a logical 0 to a logical 1 level which will disable the set input to the power status latch 68 and allow the command register 70 to reset the power status latch 68.

Figure 3A:
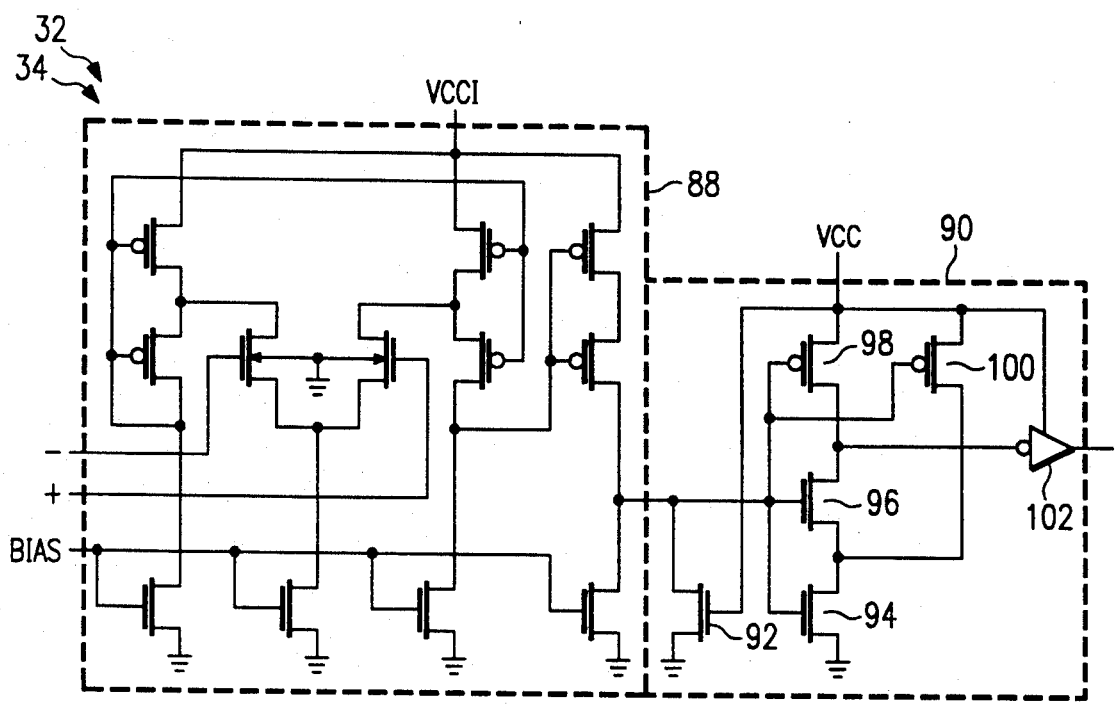
FIGS. 3A and 3B are schematic diagrams of the comparator circuits shown in FIG. 1.

FIG. 3A is a schematic diagram of the comparators 32 and 34 shown in FIG. 1. The comparator circuit shown in FIG. 3A includes a differential input stage 88 which is powered by VCCI and a logic output stage 90 powered by VCC. The logic output stage 90 includes a pull-down transistor 92 which is a high impedance transistor which is sufficiently conductive to pull the output of the differential input stage 88 to ground when the external power supply voltage VCCI is not present to power the differential input stage 88. The four transistors 94, 96, 98, and 100 operate as a Schmitt trigger to provide noise immunity to the logic output stage 90. The output of the Schmitt trigger drives an inverter circuit 102, the output of which forms the output of the comparator circuits 32 and 34.

Figure 3B:
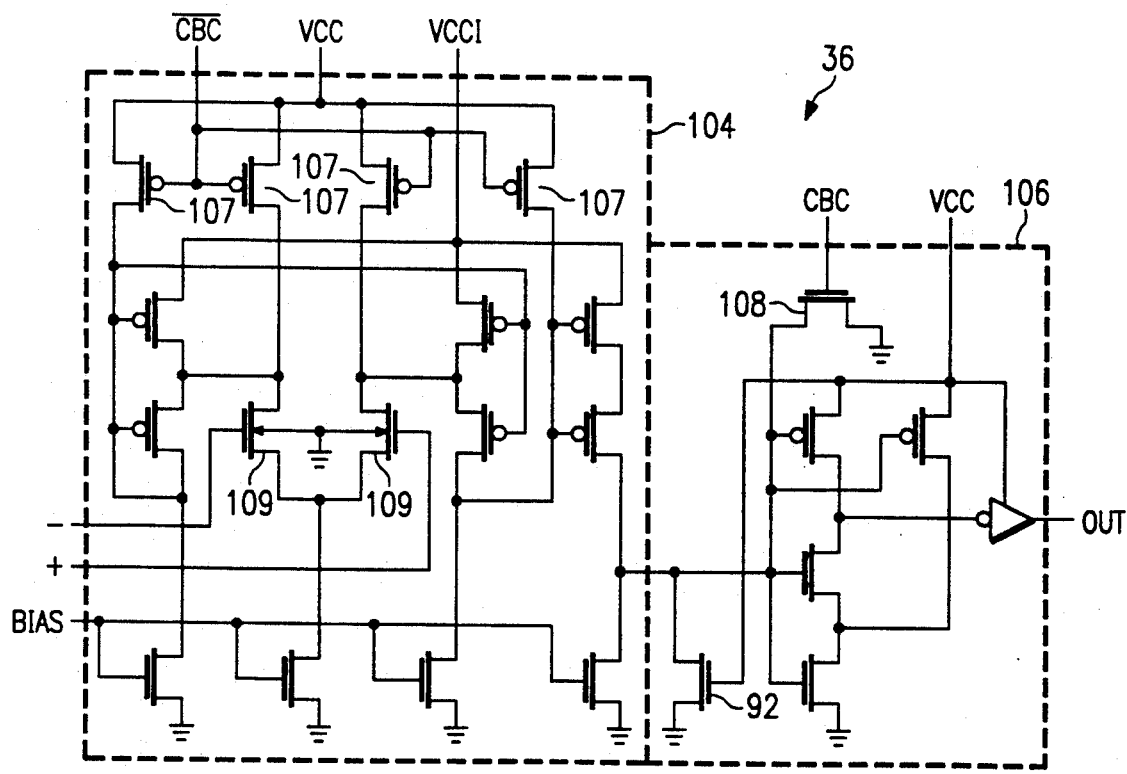

FIG. 3B is a schematic diagram of the comparator 36 which is very similar to the comparator circuit shown in FIG. 3A having a differential input stage 104 and a logic output stage 106. The comparator 36 includes a plurality of p-channel transistors 107 which couple VCC to the gates of the other p-channel in the differential input stage 104 and to the drains of the n-channel differential input transistors 109. The gates of these additional p-channel transistors 107 are driven by the CBC-bar signal. In the logic output 106 the output of the differential input stage 104 is coupled to ground through an additional n-channel transistor 108, the gate of which is driven by the CBC signal. When the CBC-bar signal is at a logical 1 level and the CBC signal is at a logical 0 level the comparator shown in FIG. 3B operates in the same manner as the comparator shown in FIG. 3A.

When the CBC-bar signal is at a logical 0 level and the CBC signal is at a logical 1 level, the p-channel transistors 107 in the differential input stage 104 operates to pull the above-described nodes in the differential input section 104 to VCC thereby clamping the differential input stage 104, and the n-channel transistor 108 operates to firmly pull the output of the differential input section 104 to ground thereby providing a solid logical 1 level on the output of the comparator 36 regardless of the voltage level of the external power supply.

Of course, the disclosed preferred embodiment can be widely modified and varied, and can be applied to a wide variety of system contexts. For example, as noted above, the presently preferred embodiment generates 32 pulses on the internal system clock line after the power-fail signal PF goes high. However, this number could be widely varied; in some architectures only one pulse of the internally generated clock phi$_{Int}$ might suffice, and in others hundreds or thousands of pulses might be desirable.

As will be recognized by those skilled in the art, the innovative concepts described in the present application can be modified and varied over a tremendous range of applications, and accordingly their scope is not limited except by the accompanying claims.

What is claimed is:

1. A microprocessor, comprising:
   a power supply input terminal;
   an external clock input terminal;
   a battery input terminal;
   programmable logic, wherein elements of said programmable logic are connected to a reset node, such that a predetermined number of internal clock cycles after a reset signal at said reset node will bring said programmable logic to a known state;
   an internal clock generator circuit: and
   clock intercept logic, said clock intercept logic connected to disconnect said programmable logic from the external clock input terminal when power failure at said power supply input terminal is detected, to provide said reset signal to said elements of said programmable logic, and to activate said internal clock generator circuit to provide clocking signals to said programmable logic until said predetermined number of internal clock cycles have occurred.

2. An integrated circuit, comprising:
   a power supply input terminal;
   an external clock input terminal;
   an internal clock
   a plurality of logic elements, wherein some, but not all, of said logic elements are connected to be controlled by a reset signal, such that a predetermined number of internal clock cycles, independent of any external clock signals at said external clock input terminal, after activation of said reset signal will bring all of said logic elements to a known state; and
   power-failure-handling logic, connected to, when power failure at said power supply input is detected, provide said reset signal, and said predetermined number of internal clock cycles thereafter, to said logic elements.

3. A nonvolatile microprocessor-based system, comprising:
   a system power supply line;
   a clock line which carries external clock signals;

a microprocessor, operatively connected to said system power supply line and to said clock line, comprising programmable logic and logic elements connected to receive a reset signal, such that activation of said reset signal, plus a predetermined number of clock cycles thereafter, will bring all of said programmable logic to a known state; and a battery, connected to provide a backup power supply voltage to said microprocessor if the voltage on said system power supply line falls below a first predetermined level;

wherein said microprocessor includes local clock logic, operatively connected to said logic elements, which, when said voltage on said system power supply line falls below a second predetermined level, activates said reset signal and provides said predetermined number of clock cycles thereafter independent of any external clock signals on said clock line.

4. The microprocessor of claim 1, further comprising integrated memory, connected to receive power from said battery input terminal when the power supply voltage at said power supply input terminal fails, so that data in said integrated memory remains valid even after the power supply has failed and recovered.

5. The microprocessor of claim 1, further comprising integrated memory, including six-transistor static random-access memory cells, connected to receive power from said battery input terminal when the power supply voltage at said power supply input terminal fails, so that data in said integrated memory remains valid even after the system power supply has failed and recovered.

6. The integrated circuit of claim 2, further comprising on-chip memory, connected to receive power from said battery input terminal when the power supply voltage at said power supply input terminal fails, so that data in said on-chip memory remains valid even after the system power supply has failed and recovered.

7. The microprocessor of claim 1, wherein said predetermined number of clock cycles is at least two.

8. The microprocessor of claim 1, wherein said predetermined number of clock cycles is in the range of 10-100, inclusive.

9. The microprocessor of claim 1, wherein said predetermined number of clock cycles is more than 30.

10. The microprocessor of claim 1, further comprising power-fail-detect circuitry connected to detect the onset of power failure at said power supply input terminal.

11. The integrated circuit of claim 2, wherein said predetermined number of clock cycles is at least two.

12. The integrated circuit of claim 2, wherein said predetermined number of clock cycles is more than 30.

13. The integrated circuit of claim 2, further comprising power-fail-detect circuitry connected to detect the onset of power failure at the power supply input terminal.

14. The system of claim 3, wherein said microprocessor further comprises integrated memory, connected to receive power from said battery input terminal when the system power supply line voltage fails, so that data in said integrated memory remains valid even after the system power supply has failed and recovered.

15. The system of claim 3, further comprising a random-access memory, packaged together with said microprocessor, said memory being connected to receive a power supply from said microprocessor and not being directly connected to said system power supply line.

16. The system of claim 3, wherein said predetermined number of clock cycles is in the range of 3-300, inclusive.

17. The system of claim 3, further comprising power-fail-detect circuitry connected to detect the onset of failure in said system power supply.

18. An integrated circuit, comprising:
a subcircuit having at least two states;
a power fail detector;
an internal clock;
an external clock input terminal coupled to said subcircuit;
a switching subcircuit connected to said power fail detector, said internal clock, said external clock input terminal, and said subcircuit;
wherein a signal from said power fail detector to said switching subcircuit drives said switching subcircuit to turn on said internal clock, decouple said external clock input terminal from said subcircuit, to couple said subcircuit to said internal clock, and to turn off said internal clock after a predetermined number of internal clock cycles.

19. The circuit of claim 18, wherein:
said power fail detector sends a reset signal to said subcircuit when a power failure is detected; and
said predetermined number of internal clock cycles following a reset signal drives said subcircuit to a predetermined state.

* * * * *